United States Patent [19]

Hiranuma et al.

[11] Patent Number: 5,509,569
[45] Date of Patent: Apr. 23, 1996

[54] AIRTIGHT FILLER NECK CAP

[75] Inventors: Takanari Hiranuma; Kyokuichi Sato, both of Soja, Japan

[73] Assignee: OM Corporation, Okayama, Japan

[21] Appl. No.: 354,552

[22] Filed: Dec. 13, 1994

[30] Foreign Application Priority Data

Dec. 24, 1993 [JP] Japan .................................. 5-327361

[51] Int. Cl.⁶ ................................................. B60K 15/035
[52] U.S. Cl. ...................... 220/746; 220/86.1; 220/86.2; 220/DIG. 33
[58] Field of Search ........................... 220/746, DIG. 33, 220/86.1, 86.2; 70/166–173; 292/DIG. 38, 87

[56] References Cited

U.S. PATENT DOCUMENTS

| 4,083,209 | 4/1978 | Sloan, Jr. .............................. 70/173 X |
| 4,299,102 | 11/1981 | Aro ....................................... 70/173 X |
| 4,573,723 | 3/1986 | Morita et al. ........................ 292/336.3 |
| 4,795,050 | 1/1989 | Smith et al. ............................. 220/746 |
| 5,020,685 | 6/1991 | Sato . | |
| 5,203,466 | 4/1993 | Kasugai et al. ................... 220/DIG. 33 |

Primary Examiner—Allan N. Shoap
Assistant Examiner—Robin A. Hylton
Attorney, Agent, or Firm—Koda and Androlia

[57] ABSTRACT

An air-tight filler neck cap wherein an operating torque is amplified to obtain a large tightening torque including an outer cap of the filler neck which includes a knob and a cover grip which is engaged with a body of an automobile to thereby prevent the cover grip from rotating and an inner cap of the filler neck cap which is moved in association with the outer cap by a planetary gear mechanism. The planetary gear mechanism includes a sun gear, planet gears and a ring gear located on a carrier disk plate which is rotatably attached to an upper face of the inner cap.

5 Claims, 9 Drawing Sheets

AIRTIGHT FILLER NECK CAP

BACKGROUND OF THE INVENTION

1. Industrial Field of the Invention

The present invention relates to a filler neck cap for a fuel tank of an automobile or the like.

2. Description of the Prior Art

A conventional filler neck cap comprises an outer cap which is turned manually and an inner cap to be inserted in a filler neck. The conventional filler neck cap is of the type in which a turning force is transmitted from the outer cap to the inner cap and a torque applied to the inner cap is limited by means of a ratchet and a latch. In such filler neck caps, it is generally held that an operating torque or a force of turning the outer cap by a hand is substantially equal to a tightening torque or a force of screwing the inner cap. The filler neck cap of the aforesaid type has been disclosed in, for example, U.S. Pat. Nos. 4,676,390, 5,020,685, 5,183,173, 5,203,466, Japanese Patent Unexamined Publication No. 59-209547 (1984) or the like. Further, there is a filler neck cap including a valve of the pressure release type or the auto venting type in which the pressure is automatically released when the pressure in the tank becomes abnormally high. In the above filler neck cap, airtightness at the filler neck is established by pressing an O-ring fitted on the inner cap against an inner peripheral surface of the filler neck when the filler neck cap is screwingly inserted in the filler neck. For these reasons, when the manually tightening torque applied to the inner cap is insufficient, gas leakage may occur before the valve of the pressure release type or of the auto venting type fulfills its function.

SUMMARY OF THE INVENTION

In recent years, for protecting the global environments, a regulation for controlling an HC (hydrocarbon) transpiration has been issued, and accordingly, there arises a demand for ensuring high airtightness at the filler neck. As means for satisfying the requirement, it is generally required to increase the tightening torque of the filler neck cap, in other words, to screw the inner cap of the filler neck cap into the filler neck more tightly so as to press the O-ring more strongly.

However, because the operating torque is substantially equal to the tightening torque in the conventional filler neck cap, an increase of the tightening torque leads to an increase of the diameter of the filler neck cap. This possesses various problems such that a rotating operation of the filler neck cap becomes tedious, the filler neck cap cannot be used for existing automobiles because of its increased diameter, and the whole mechanism of the filler neck cap contradicts a demand for the compactness of today.

In view of the above, the inventors of this invention have studied a filler neck cap which can be used for existing automobiles, which can be favorably operated and which can cope with a demand for compactness which will occur in the future, which can increase only a tightening torque of an inner cap while having an operating torque and an outer diameter of an outer cap substantially equal to those of the conventional one, in order to press an O-ring more strongly with the increased tightening torque to thereby heighten a degree of airtightness at the filler neck.

In order to solve the aforesaid problems, there is developed a filler neck cap comprising an outer cap and an inner cap having a male screw thread formed on its outer periphery, in which the outer cap includes a knob and a cover grip, the cover grip is engaged with a body of an automobile so as to be restrained from rotation, and the inner cap is rotated in association with the movement of the (knob) of the outer cap through a planetary gear mechanism.

The planetary gear mechanism comprises a sun gear, one or more planet gears, and a ring gear. The sun gear connected to the grip is located on a center of a carrier disk plate rotatably attached on an upper face of the inner cap. The planet gears are rotatably attached on the carrier disk plate so as to engage with the sun gear. The ring gear is preferably formed integrally with the cover grip of the outer cap so that it can engage with the planet gears. A ratchet provided on the carrier disk plate and latches provided on the inner cap are engaged with each other to limit a torque in a direction of closure of the knob.

The cover grip can be prevented from rotation by engaging an outer peripheral side face of the cover grip with a concave portion of a wall surface of a filler box, or engaging a lower edge of the cover grip with an upper edge of the filler neck.

In the filler neck cap according to the invention, transmission of movement in case of turning the filler neck cap in a closing direction, that is, for tightly attaching the filler neck cap on the filler neck will be described below. First, the sun gear is rotated in the direction of closure by means of the knob. Meanwhile, the cover grip is restrained from rotation due to engagement between the outer peripheral side face of the cover grip and the concave portion of the wall surface of the filler box, or between the lower edge of the cover grip and the upper edge of the filler neck.

The ring gear is stationary because the cover grip is not rotated. The planet gears engaging with the sun gear and the ring gear rotate in a direction reverse to the sun gear while they roll on the ring gear and revolve in the direction of rotation of the sun gear. The revolution of the planet gears allows the carrier disk plate to rotate. As a result, the inner cap is rotated.

When a gear ratio between the ring gear and the sun gear is represented by R, it can be said that the movement of the carrier disk plate is decreased to $1/(1+R)$ times the movement of the sun gear, and the torque applied to the carrier disk plate is amplified to $(1+R)$ times the torque of the sun gear. As for the carrier disk plate and the inner cap, the ratchet and the latch engage with each other in such a manner that the torque applied to the inner cap is limited, to thereby keep constant the tightening torque of the filler neck cap. Therefore, it is possible to prevent the inner cap from breakage which often happens when the secondarily amplified torque is excessively applied to the inner cap.

DESCRIPTION OF THE INVENTION

Preferred embodiments of a filler neck cap according to the present invention will now be described with reference to the drawings.

Figure 1:
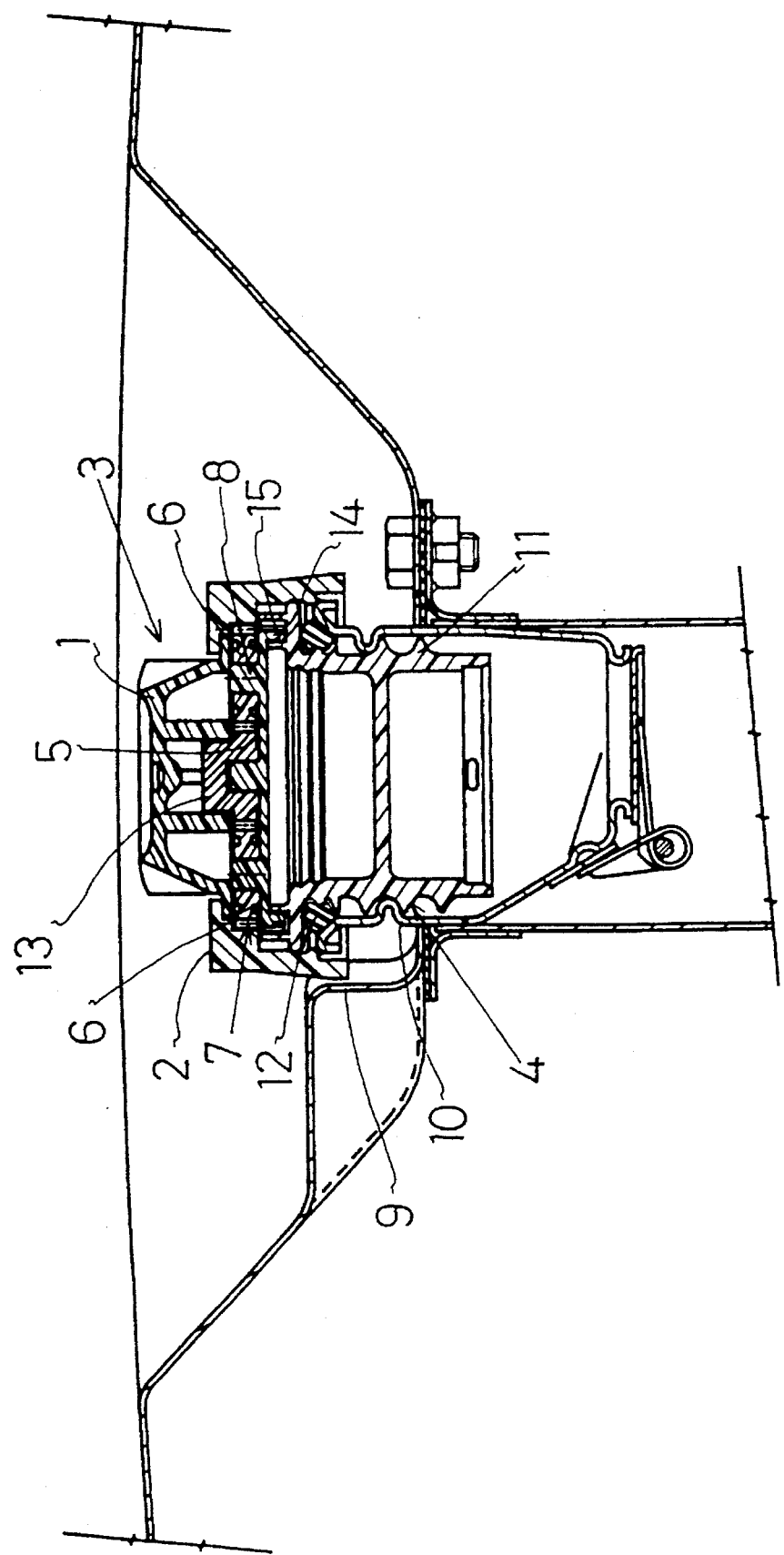
FIG. 1 is a vertical cross-sectional view of a filler neck cap according to a first embodiment of the present invention, when it is mounted on a filler neck.
Figure 2:
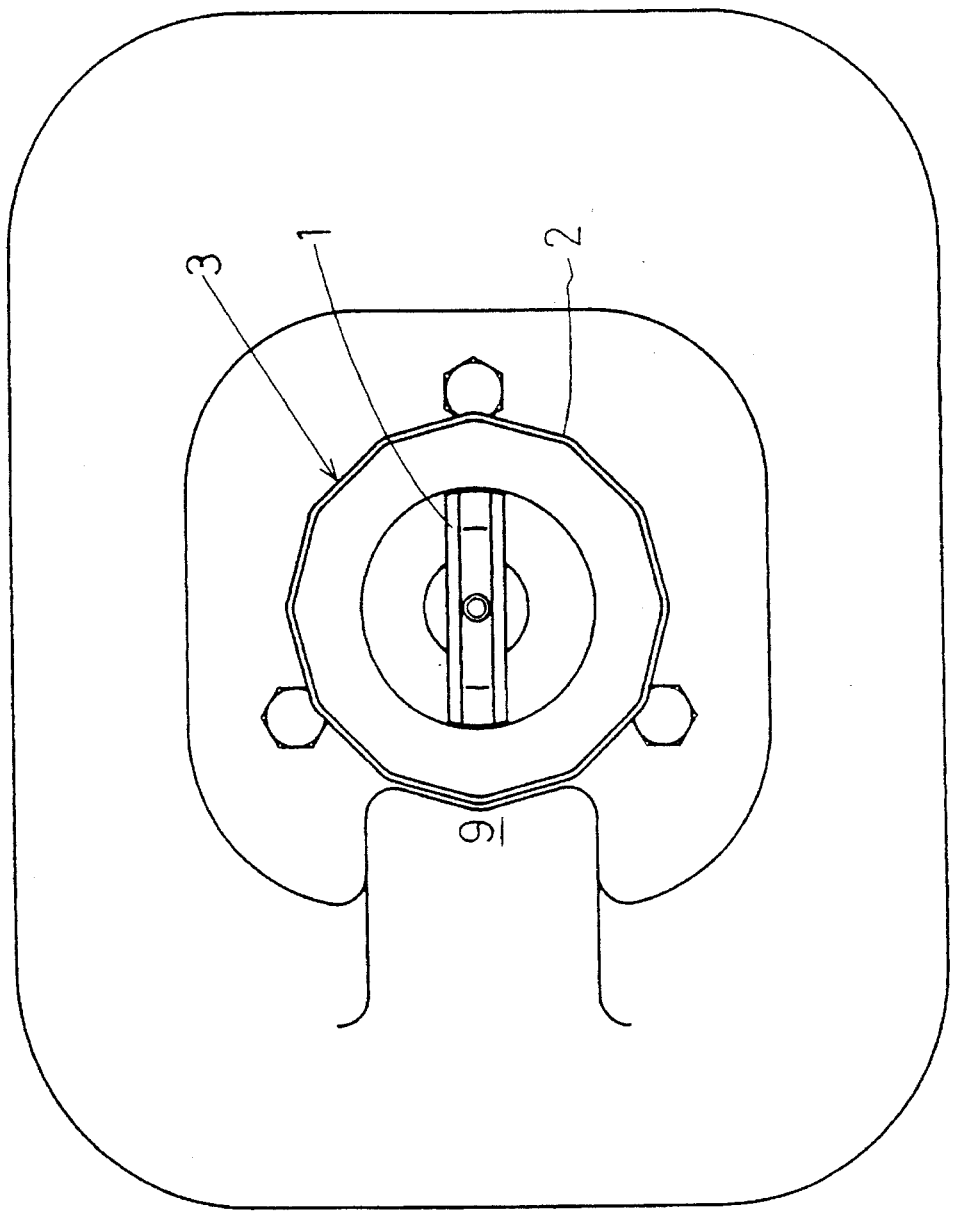
FIG. 2 is a plan view of the filler neck cap which is shown in FIG. 1.
Figure 3:
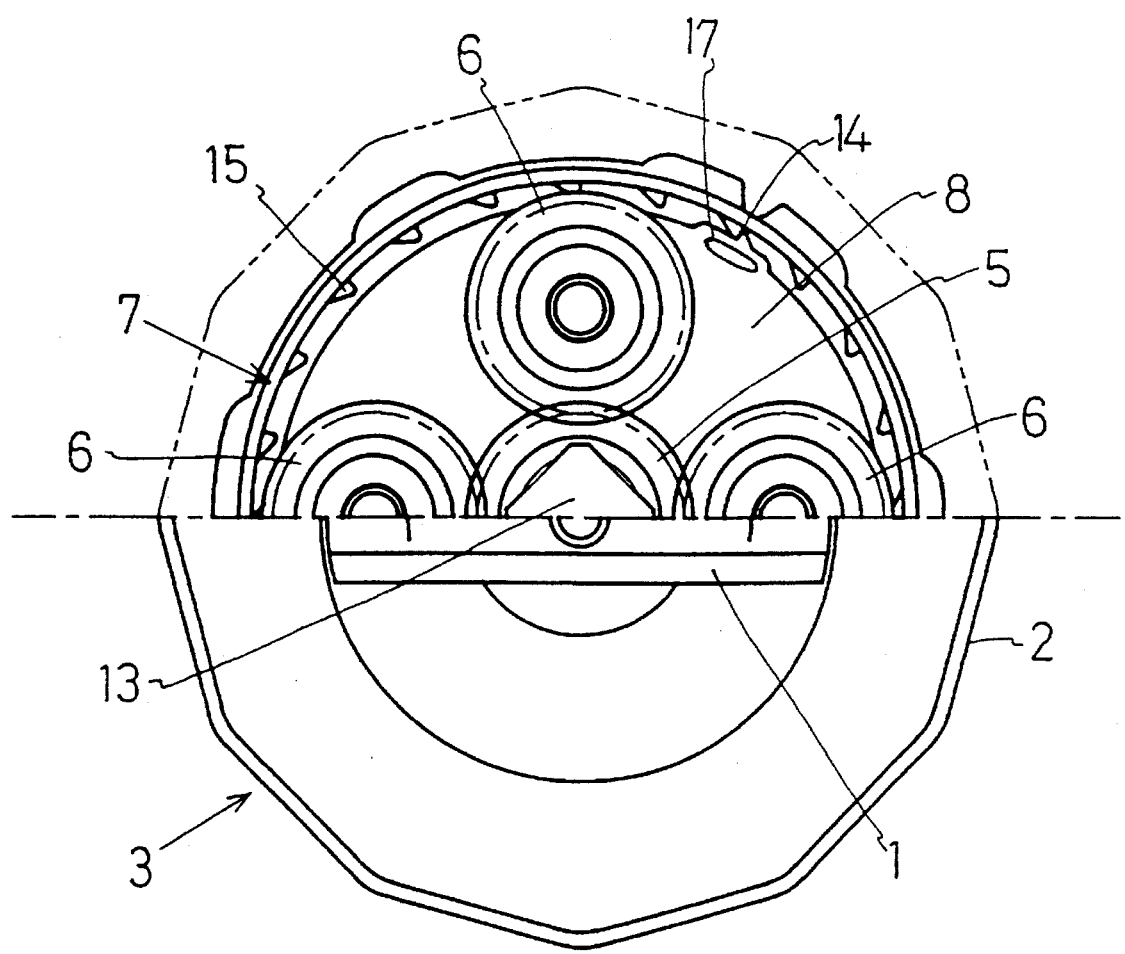
FIG. 3 is a partially cutaway plan view of the filler neck cap in which a half of an outer cap of the filler neck cap is removed.

FIGS. 1 to 3 show a first embodiment of the filler neck cap according to the invention. This filler neck cap is of the type in which a cover grip 2 of an outer cap 3 is engaged with and retained by an inner wall surface 9 of a filler box which surrounds the outer periphery of the cover grip 2.

As clearly understood from FIGS. 1 and 2, the filler neck cap of the first embodiment is designed to be secured in an opening of a filler neck 10. The filler neck 10 includes a threaded portion in the vicinity of the bottom surface of the filler box. The filler neck cap comprises the outer cap 3 and an inner cap 4, the outer cap 3 including a rotatable knob 1 and the cover grip 2. The rotatable knob 1 is associated with the cover grip 2 through a planetary gear mechanism.

In the illustrated embodiment of the invention, the cover grip 2 is shown to have a substantially dodecagonal shape in cross section. The cover grip 2 can be held by the inner surface 9 of the filler box wall surrounding the cover grip 2 in conformity with the outer surface thereof. Assuming that the cover grip 2 is held by the wall surface 9 from the beginning of the tightening operation of the filler neck cap, the whole operation unfavorably becomes tedious. Accordingly, the inner cap 4 having a male screw thread 11 on its outer periphery is firstly inserted into the filler neck 10 at a certain distance by screwing, and then, the cover grip 2 is engaged with the wall surface 9 of the filler box. More particularly, after an O-ring 12 fitted on the inner cap 4 forcedly contacts with an upper end of the filler neck 10, the cover grip is held by the wall surface of the filler box in order to quickly rotate the cap around the filler neck.

Referring to FIG. 3, the planetary gear mechanism includes a sun gear 5 and four planet gears 6. The sun gear 5 is rotatably attached on a center of a carrier disk plate 8. The carrier disk plate is rotatably connected to an upper face of the inner cap 4. The planet gears 6 are also rotatably connected on the carrier plate 8 in such a manner that they are located around the sun gear 5. In the illustrated embodiment, a square pin 13 is integrally formed with the sun gear 5 and projects from an upper face of it. The square pin 13 is connected to the knob 1, so that the sun gear 5 is moved by the knob 1. The sun gear and the knob can be formed integrally with each other. If so, the number of steps of assembling the component parts can be decreased and the transmission of movement between the knob and the sun gear can be realized. The planet gears 6 are meshed with a ring gear 7 formed on an inner periphery of the cover grip 2.

In the first embodiment, a ratchet 14 is formed on an outer periphery of the carrier disk plate 8, and latches 15 are provided on an inner periphery of the inner cap 4 in association with the ratchet 14. When the carrier disk plate 8 is rotatingly driven by the planet gears 6 which are rotated by the sun gear 5, the rotation torque of the carrier disk plate is transmitted from the ratchet 14 to the latches 15, whereby the knob 1 can forcibly drive the inner cap 4 to be screwed into the filler neck 10. Thus, the ratchet 14 and the engaged latch 15 constitute a torque limitation mechanism.

Alternatively, the ratchet 14 may be provided on the inner periphery of the inner cap 4 and the latches 15 may be provided on the outer periphery of the carrier disk plate 8.

The ratchet 14 includes a hole 17 for giving elasticity in a radial direction of the carrier disk plate 8 to the ratchet. In FIG. 3, the hole 17 is formed in the vicinity of the root portion of the ratchet 14 so that the ratchet 14 can deform in the radial direction of the carrier disk plate 8 when the excessive rotational force is applied to the knob 1. The ratchet 14 may ordinarily press-contact with the latch 15 to realize favorable engagement between them more securely. According to the planetary gear mechanism in the first embodiment, the force applied by the user is multiplied by four times. A high amplification rate of the torque is thus obtained. The diameters of the sun and planet gears of the planetary gear mechanism are selectively predetermined. When a tightening torque limitation value is set at 80 kgcm, an operating torque of 20±5 kgcm need only be applied.

In the filler neck cap according to the first embodiment, when the sun gear 5 is rotated by the knob 1, the planet gears 6 revolve around the sun gear while a portion of the filler neck cap or the cover grip 2 of the outer cap 3 is securely held, so as to amplify the operating torque. At this time, it is important that the cover grip 2 is prevented from rotation with respect to the rotating knob 1.

Figure 4:
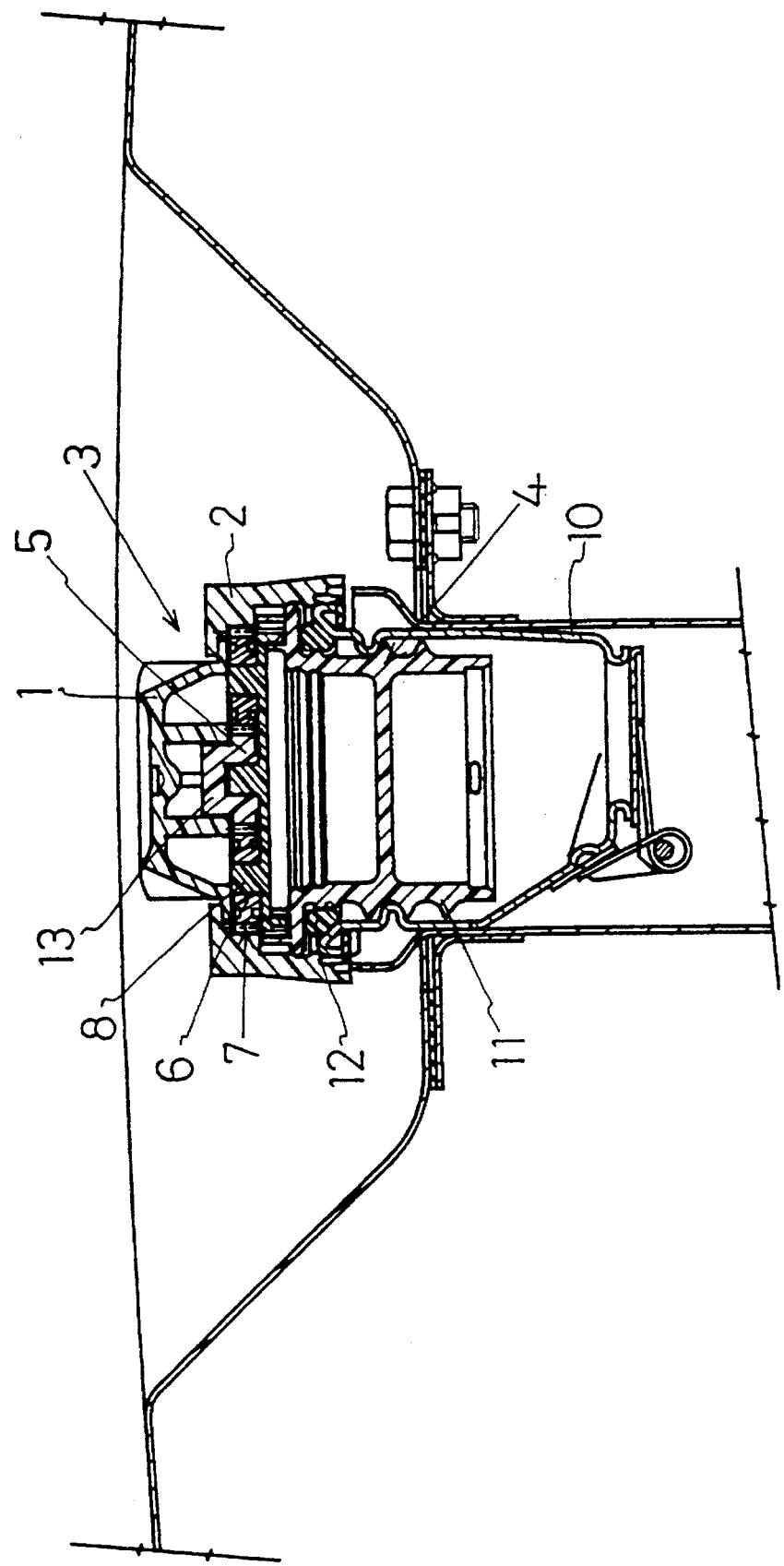
FIG. 4 is a vertical cross-sectional view of a filler neck cap according to a second embodiment of the invention, when it is mounted on a filler neck.
Figure 5:
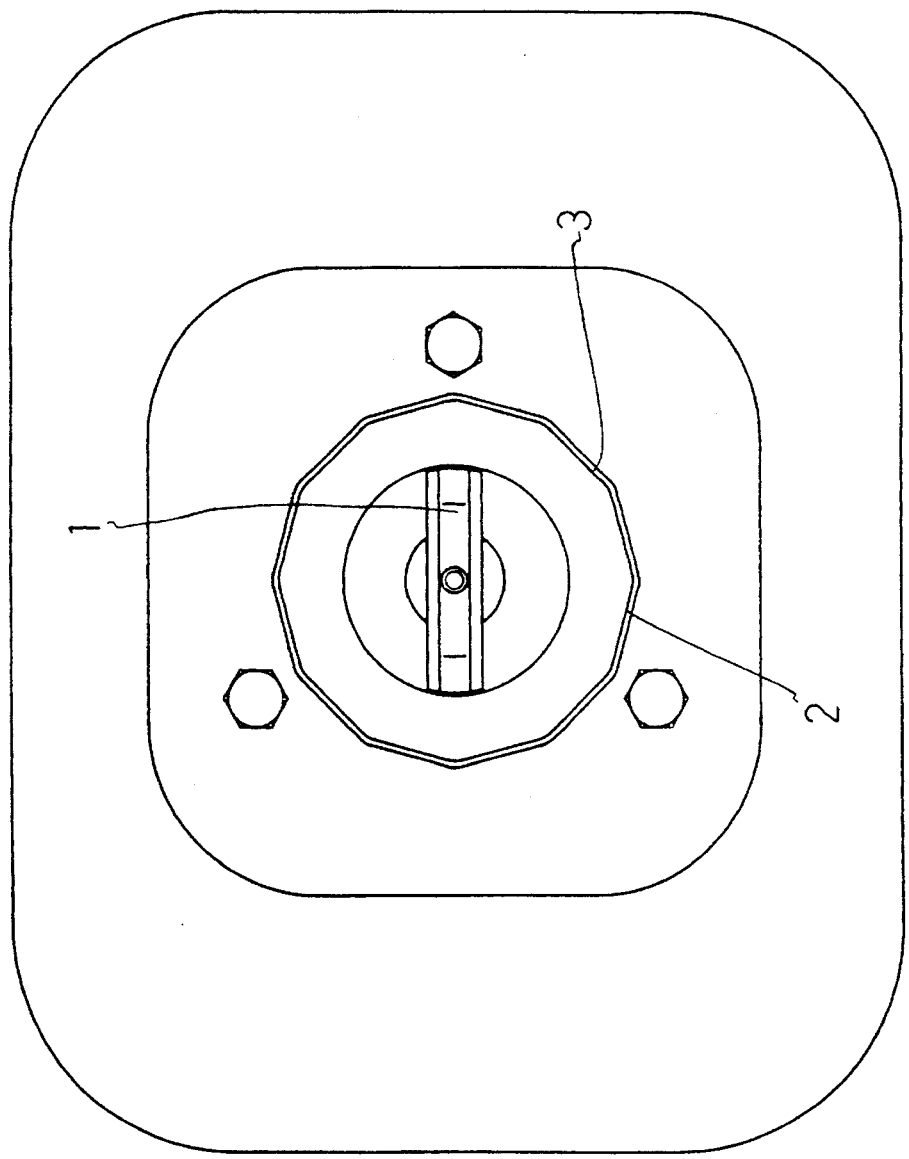
FIG. 5 is a plan view of the filler neck cap which is shown in FIG. 4.
Figure 6:
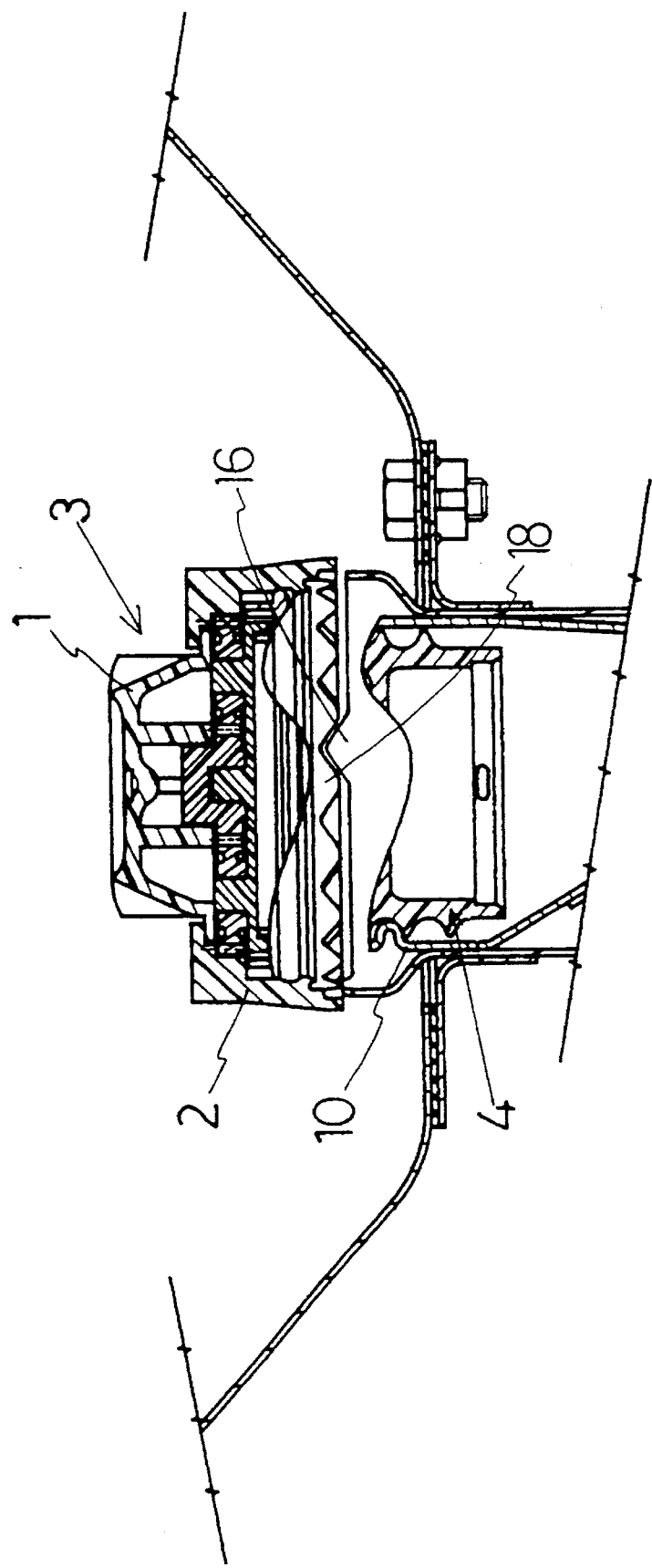
FIG. 6 is a partially cutaway vertical cross-sectional view of the filler neck cap of FIG. 4, when a cover portion of the filler neck cap is engaged with the filler neck.

FIGS. 4 to 6 illustrate a second embodiment of the invention in which another method of holding the cover grip is shown.

According to the second embodiment, a lower edge of a cover grip 2 of an outer cap 3 is formed with a notched portion 18 like the teeth of a saw. The notched portion 18 is engaged with protruded portions consisting of three projections 16 formed at an upper edge of a filler neck 10. In such a state that a filler neck cap is tightly screwed in the filler neck 10, the cover grip 2 is engaged with the filler neck 10 by means of these projections 16 so as to be restrained from rotation. Other parts and structures of the filler neck cap of the second embodiment except the above-described parts are similar to those of the first embodiment, as recognized from comparisons between FIG. 4 and FIG. 1 and between FIG. 5 and FIG. 2, and as seen in FIG. 3. Therefore, the description thereof will be omitted.

Figure 7:
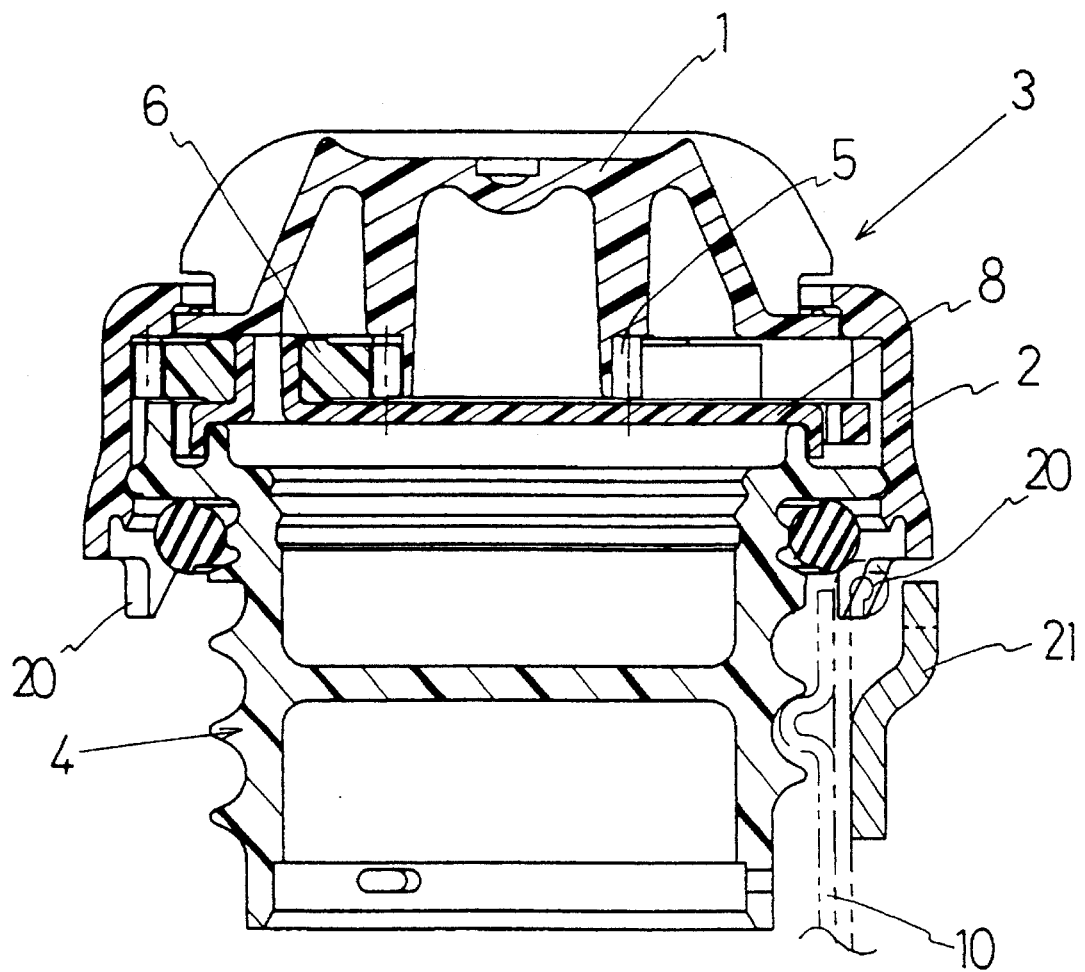
FIG. 7 is a vertical cross-sectional view of a filler neck cap according to a third embodiment of the invention.
Figure 8:
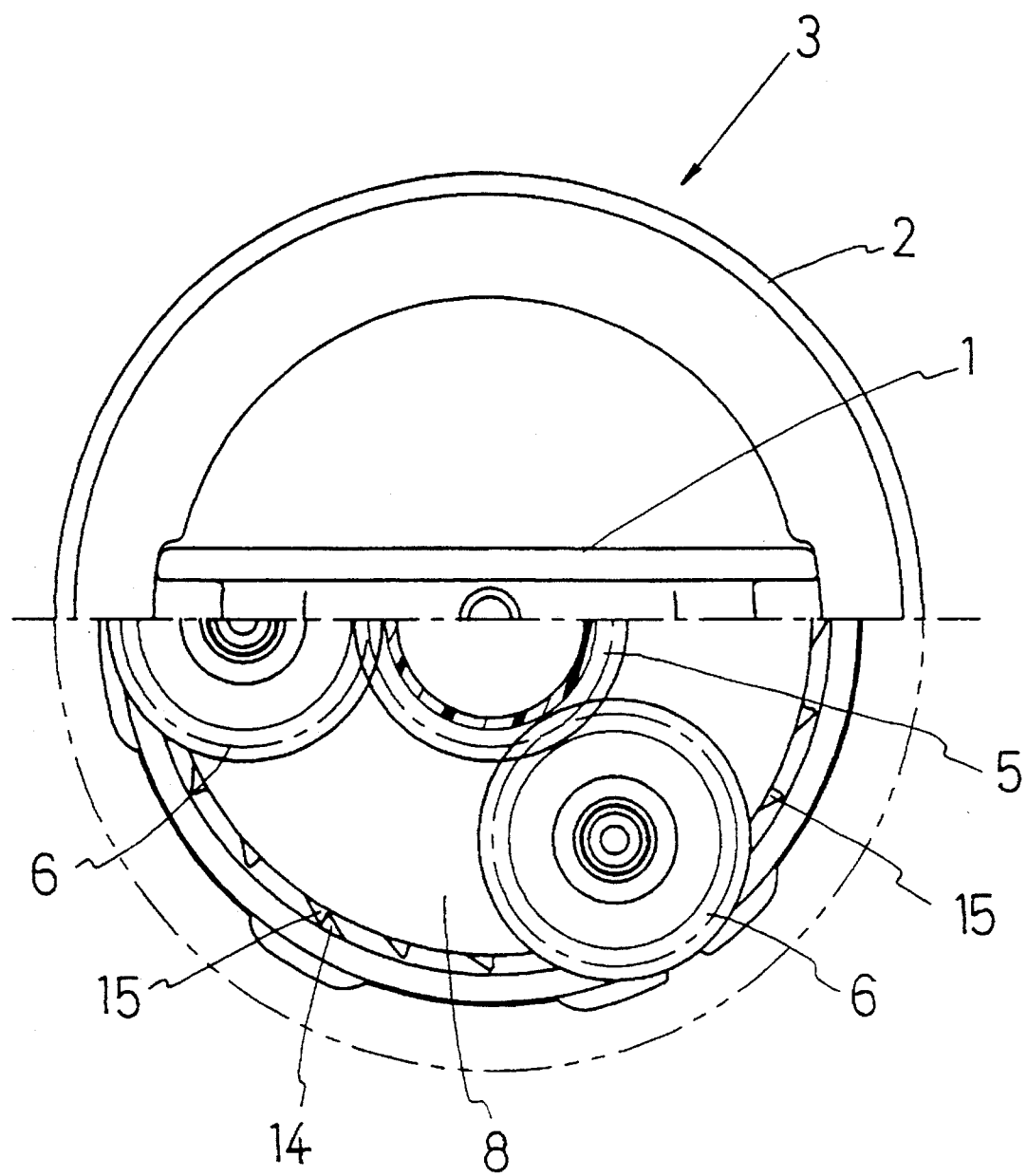
FIG. 8 is a partially cutaway plan view of the filler neck cap shown in FIG. 7, in which a half of an outer cap of the filler neck cap is removed.
Figure 9:
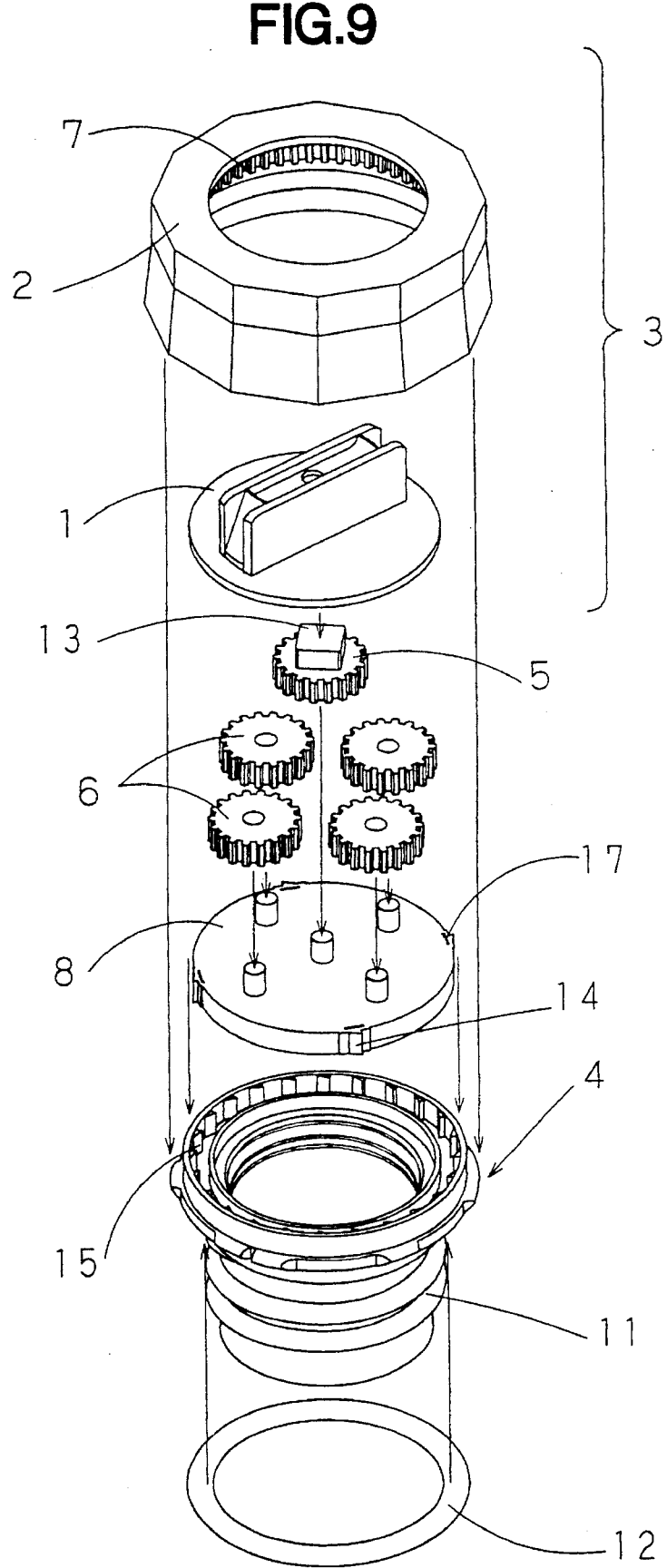
FIG. 9 is an exploded perspective view showing the major elements of the filler neck cap of the present invention.

FIGS. 7 and 8 illustrate a third embodiment of the invention. As clearly understood from these figures, the third embodiment differs from the second embodiment in the following three points that: a sun gear 5 and a knob 1 of an outer cap are integrally formed of plastic material; the number of planet gears 6 to engage with the sun gear 5 is three; and latches 15 are formed on a carrier disk plate 8 and a ratchet 14 is formed on an inner cap 4, in contrast to the second embodiment. Accordingly, the number of component parts in the third embodiment is smaller than that in the second embodiment, and the assembling work is more facilitated. Further, a mechanism for restraining rotation of a cover grip 2 of the outer cap is structured such that six projections 20 at a lower edge of the cover grip 2 are engaged with a metallic protruding piece 21 fixedly attached to an outer wall of a filler neck 10 by spot welding or the like. With the above structure, working processes of machining an end edge of the filler neck pipe are advantageously simplified, as compared with the second embodiment.

According to the filler neck cap of the present invention, the operating torque is suitably amplified by making use of the planetary gear mechanism. In the planetary gear mechanism, the gear ratio (R) between the sun gear 5 and the ring gear 7 has a relation to the torque amplification rate (1+R). The planet gears 6 mainly serve to transmit the movement from the outer cap to the inner cap and rotate reversely to the sun gear. For the reasons, one or more planet gears may be used to sufficiently fulfill such a function. Moreover, in order to surely and stably carry out the movement transmitting function, it is required to locate the planet gears symmetrically with respect to the sun gear, as seen in the first to third embodiments.

According to the filler neck cap of the invention, the O-ring is pressed against the filler neck with the tightening torque obtained by amplifying the operating torque, so that high airtightness at the filler neck can be realized, which conforms to the regulation for controlling an HC (hydrocarbon) transpiration. Moreover, the filler neck cap of the invention can be operated as readily as the conventional one, and it can be used for the existing automobiles. The filler neck cap may be made more compact if necessary, so that a cost saving effect can be increased and utility of the filler neck cap can be improved.

What is claimed is:

1. A filler neck cap comprising an outer cap and an inner cap having a male screw thread formed on its outer periphery, wherein said outer cap includes a knob and a cover grip, said cover grip is engaged with a body of an automobile so as to be restrained from rotation, and said inner cap is rotated in association with the movement of the knob of the outer cap through a planetary gear mechanism, a carrier disk plate rotatably attached on an upper face of said inner cap and wherein said planetary gear mechanism comprises a sun gear, one or more planet gears and a ring gear, said sun gear connected to said knob is located on said carrier disk plate, said planet gears are rotatably connected to said carrier disk plate so that they engage with said sun gear, and said ring gear is formed integrally with the cover grip of the outer cap such that it engages with said planet gears.

2. A filler neck cap according to claim 1, wherein said outer cap is designed such that an outer peripheral protruded side face of said cover grip is engaged with a concave portion of a wall surface of a filler box to prevent the cover grip from rotation when the knob is rotated.

3. A filler neck cap according to claim 1, wherein said outer cap is designed such that the cover grip is prevented from rotation by engaging projections formed at a lower edge of said cover grip with a protrusion formed at an upper edge of a filler neck when the knob is rotated.

4. A filler neck cap according to claim 1, wherein a ratchet provided on said carrier disk plate and latches provided on said inner cap are engaged with each other to limit a torque in a direction of closure of the knob.

5. A filler neck cap according to claim 1 wherein latches provided on said carrier disk plate and a ratchet provided on said inner cap are engaged with each other to limit a torque in a direction of closure of the knob.

* * * * *